(12) United States Patent
Tang

(10) Patent No.: US 11,096,146 B2
(45) Date of Patent: Aug. 17, 2021

(54) INFORMATION TRANSMISSION METHOD AND RELATED PRODUCT

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 47 days.

(21) Appl. No.: 16/613,378

(22) PCT Filed: May 17, 2017

(86) PCT No.: PCT/CN2017/084734
§ 371 (c)(1),
(2) Date: Nov. 13, 2019

(87) PCT Pub. No.: WO2018/209602
PCT Pub. Date: Nov. 22, 2018

(65) Prior Publication Data
US 2020/0178205 A1 Jun. 4, 2020

(51) Int. Cl.
*H04W 68/02* (2009.01)
*H04W 52/02* (2009.01)

(52) U.S. Cl.
CPC ....... *H04W 68/02* (2013.01); *H04W 52/0216* (2013.01); *H04W 52/0229* (2013.01)

(58) Field of Classification Search
CPC ............. H04W 68/02; H04W 52/0216; H04W 52/0229; H04W 76/28; H04W 72/042; H04L 29/06
See application file for complete search history.

(56) References Cited

U.S. PATENT DOCUMENTS 8,295,243 B2   10/2012   Malladi
8,982,743 B2   3/2015    Luo
(Continued)

FOREIGN PATENT DOCUMENTS

CN    102948109 A    2/2013
CN    103491644 A    1/2014
(Continued)

OTHER PUBLICATIONS

International Search Report in the international application No. PCT/CN2017/084734, dated Nov. 7, 2017. English translation provided by WIPO.
(Continued)

*Primary Examiner* — Diane D Mizrahi
(74) *Attorney, Agent, or Firm* — Ladas & Parry, LLP

(57) ABSTRACT

Disclosed in the present application are an information transmission method and a related product. The method comprises: a user equipment listens for a physical downlink control channel (NR-PDCCH) to obtain first information transmitted on the NR-PDCCH, the first information being used for determining, by the user equipment, whether the NR-PDCCH is for the user equipment; and when the NR-PDCCH is for the user equipment, the user equipment listens for a corresponding physical downlink data shared channel (NR-PDSCH) to obtain second information transmitted on the NR-PDSCH, the second information comprising identifier information of a first part of a user. By using embodiments of the present application, signaling overheads are reduced.

17 Claims, 5 Drawing Sheets

(56) References Cited

U.S. PATENT DOCUMENTS

| | | |
|---|---|---|
| 9,300,446 B2 | 3/2016 | Malladi et al. |
| 9,306,713 B2 | 4/2016 | Malladi et al. |
| 2008/0268877 A1 | 10/2008 | Harris |
| 2008/0273610 A1 | 11/2008 | Malladi |
| 2011/0280164 A1 | 11/2011 | Luo |
| 2013/0016701 A1 | 1/2013 | Malladi |
| 2014/0133443 A1 | 5/2014 | Malladi et al. |
| 2018/0199361 A1 | 7/2018 | Zhang et al. |
| 2018/0316464 A1 | 11/2018 | Stern-Berkowitz et al. |
| 2018/0317198 A1 | 11/2018 | Lee et al. |
| 2019/0045481 A1* | 2/2019 | Sang .................. H04B 1/713 |
| 2020/0305151 A1* | 9/2020 | Shimezawa ....... H04W 72/0446 |

FOREIGN PATENT DOCUMENTS

| | | |
|---|---|---|
| CN | 105898867 A | 8/2016 |
| CN | 106535351 A | 3/2017 |
| WO | 2016163623 A1 | 10/2016 |
| WO | 2017079539 A1 | 5/2017 |
| WO | 2017079574 A1 | 5/2017 |

OTHER PUBLICATIONS

Written Opinion of the International Search Authority in the international application No. PCT/CN2017/084734, dated Nov. 7, 2017. English translation provided by Google translate.
Supplementary European Search Report in the European application No. 17909988.2, dated May 29, 2020.
Written Opinion of the International Search Authority in the international application No. PCT/CN2017/084734, dated Nov. 7, 2017.
NTT DOCOMO, Inc., Revised WID on New Radio Access Technology, Approval, 3GPP TSG RAN Meeting #77 RP-172115, Sep. 11-14, 2017.
First Office Action of the Europe application No. 17909988.2, dated Apr. 23, 2021.
First Office Action of the India application No. 201917050208, dated Apr. 15, 2021.
First Office Action of the Japanese application No. 2019-562547, dated Mar. 23, 2021.
First Office Action of the Korea application No. 10-2019-7032777, dated Apr. 15, 2021.
Huawei, HiSilicon, Multi-beam Paging for NR[online], 3GPP TSG RAN WG1 #89, 3GPP, May 6, 2017, R1-1706975.

* cited by examiner

INFORMATION TRANSMISSION METHOD AND RELATED PRODUCT

CROSS REFERENCE

This application is the U.S. national stage of PCT Application No. PCT/CN2017/084734, filed on May 17, 2017 and titled INFORMATION TRANSMISSION METHOD AND RELATED PRODUCT, the contents of which are hereby incorporated by reference in its entirety.

TECHNICAL FIELD

The disclosure relates to the technical field of communication, and more particularly to an information transmission method and a related product.

BACKGROUND

In a Discontinuous Reception (DRX) cycle, User Equipment (UE) may only monitor whether a Paging Radio Network Temporary Identity (P-RNTI) is carried in a Physical Downlink Control Channel (PDCCH) or not at a Paging Occasion (PO) in a corresponding Paging Frame (PF). The P-RNTI presently is a fixed value FFFE. If the P-RNTI is carried in the PDCCH, it is indicated that a Physical Downlink Shared Channel (PDSCH) carries a paging message. If the PDSCH carries the paging message, the UE receives the paging message in the PDSCH according to a parameter of the PDSCH indicated in the PDCCH. The paging message carried in the PDSCH includes identification information of a UE, and the identification information of the UE is configured for the UE to determine whether the paging message carried in the PDSCH includes its own paging message or not. If the UE does not obtain the P-RNTI in the PDCCH by analysis, the UE is not required to receive the PDSCH anymore, and in such case, the UE may sleep according to the DRX cycle. By such a mechanism, in a DRX cycle, UE may only receive a PDCCH at a time position of a PO and then receive a PDSCH according to a requirement, and the UE may sleep at other times, so as to achieve a purpose of power saving.

In New Radio (NR), a beam is required to send a paging message. Each paging message is required to be repeatedly sent on beams in different directions to serve UE at different positions. Therefore, the paging messages with the same size are required to be repeatedly sent for many times, which brings a relatively high signaling overhead.

SUMMARY

Embodiments of the disclosure provide an information transmission method and a related product, to reduce a signaling overhead.

According to a first aspect, the embodiments of the disclosure provide an information transmission method, which includes the following operations.

UE monitors an NR-PDCCH to obtain first information transmitted in the NR-PDCCH, the first information being configured for the UE to determine whether the NR-PDCCH is for the UE or not.

When the NR-PDCCH is for the UE, the UE monitors an NR-PDSCH to obtain second information transmitted in the NR-PDSCH, the second information including a first part of identification information of a UE.

According to a second aspect, the embodiments of the disclosure provide an information transmission method, which includes the following operations.

A network device transmits first information in an NR-PDCCH, the first information being configured for UE to determine whether the NR-PDCCH is for the UE or not.

The network device transmits second information in an NR-PDSCH, the second information including a first part of identification information of a UE.

According to a third aspect, the embodiments of the disclosure provide a UE, which includes a processing unit and a communication unit.

The processing unit is configured to monitor, through the communication unit, an NR-PDCCH to obtain first information transmitted in the NR-PDCCH, the first information being configured for the UE to determine whether the NR-PDCCH is for the UE or not.

The processing unit is further configured to, when the NR-PDCCH is for the UE, monitor, through the communication unit, an NR-PDSCH to obtain second information transmitted in the NR-PDSCH, the second information including a first part of identification information of a UE.

According to a fourth aspect, the embodiments of the disclosure provide a network device, which includes a processing unit and a communication unit.

The processing unit is configured to transmit, through the communication unit, first information in an NR-PDCCH, the first information being configured for a UE to determine whether the NR-PDCCH is for the UE or not.

The processing unit is further configured to transmit, through the communication unit, second information in an NR-PDSCH, the second information including a first part of identification information of a UE.

According to a fifth aspect, the embodiments of the disclosure provide a UE, which includes one or more processors, one or more memories, one or more transceivers and one or more programs.

The one or more programs are stored in the memories and configured to be executed by the one or more processors.

The programs include instructions for executing the steps in the method according to the first aspect.

According to a sixth aspect, the embodiments of the disclosure provide a network device, which includes one or more processors, one or more memories, one or more transceivers and one or more programs.

The one or more programs are stored in the memories and configured to be executed by the one or more processors.

The programs include instructions for executing the steps in the method according to the second aspect.

According to a seventh aspect, the embodiments of the disclosure provide a computer-readable storage medium having stored therein a computer program for electronic data exchange, the computer program enabling a computer to execute the method according to the first aspect.

According to an eighth aspect, the embodiments of the disclosure provide a computer-readable storage medium having stored therein a computer program for electronic data exchange, the computer program enabling a computer to execute the method according to the second aspect.

According to a ninth aspect, the embodiments of the disclosure provide a computer program product, which includes a non-transitory computer-readable storage medium having stored therein a computer program, the computer program being operated to enable a computer to execute the method according to the first aspect.

According to a tenth aspect, the embodiments of the disclosure provide a computer program product, which includes a non-transitory computer-readable storage medium having stored therein a computer program, the computer program being operated to enable a computer to execute the method according to the second aspect.

It can be seen that, in the solutions, the network device only sends part of the identification information of a UE in the PDSCH, and compared with a conventional art where complete identification information of the UE is sent in the PDSCH, such a solution has the advantages that the number of bits required to be carried in the NR-PDSCH may be reduced and a signaling overhead is further reduced. Moreover, the first information transmitted by the network device in the PDCCH is used for the UE to determine whether the PDCCH is for itself or not, and compared with the conventional art where whether the PDCCH is for the UE or not is not indicated, such a solution has the advantages that the UE may exclude transmission of a PDSCH that is not for itself, and performance of information transmission is further improved.

These aspects or other aspects of the disclosure will become clearer and more readily understood through the following descriptions about the embodiments.

BRIEF DESCRIPTION OF DRAWINGS

In order to describe the technical solutions in the embodiments of the disclosure or a conventional art more clearly, the drawings required to be used in descriptions about the embodiments or the conventional art will be simply introduced below. It is apparent that the drawings described below are only some embodiments of the disclosure. Other drawings may further be obtained by those of ordinary skill in the art according to these drawings without creative work.

DETAILED DESCRIPTION

In order to make the solutions of the disclosure better understood by those skilled in the art, the technical solutions in the embodiments of the disclosure will be clearly and completely described below in combination with the drawings in the embodiments of the disclosure. It is apparent that the described embodiments are not all embodiments but only part of embodiments of the disclosure. All other embodiments obtained by those of ordinary skill in the art on the basis of the embodiments in the disclosure without creative work shall fall within the scope of protection of the disclosure.

Detailed descriptions will be made below respectively.

Terms "first", "second", "third", "fourth" and the like in the specification, claims and drawings of the disclosure are adopted not to describe a specific sequence but to distinguish different objects. In addition, terms "include" and "have" and any transformations thereof are intended to cover non-exclusive inclusions. For example, a process, method, system, product or device including a series of steps or units is not limited to the steps or units which have been listed but optionally further includes steps or units which are not listed or optionally further includes other steps or units intrinsic to the process, the method, the product or the device.

"Embodiment" mentioned herein means that a specific feature, structure or characteristic described in combination with an embodiment may be included in at least one embodiment of the disclosure. Each position where this phrase appears in the specification does not always refer to the same embodiment as well as an alternative or independent embodiment mutually exclusive to another embodiment. It is explicitly and implicitly understood by those skilled in the art that the embodiments described in the disclosure may be combined with other embodiments.

The embodiments of the disclosure will be described below in combination with the drawings.

Figure 1:
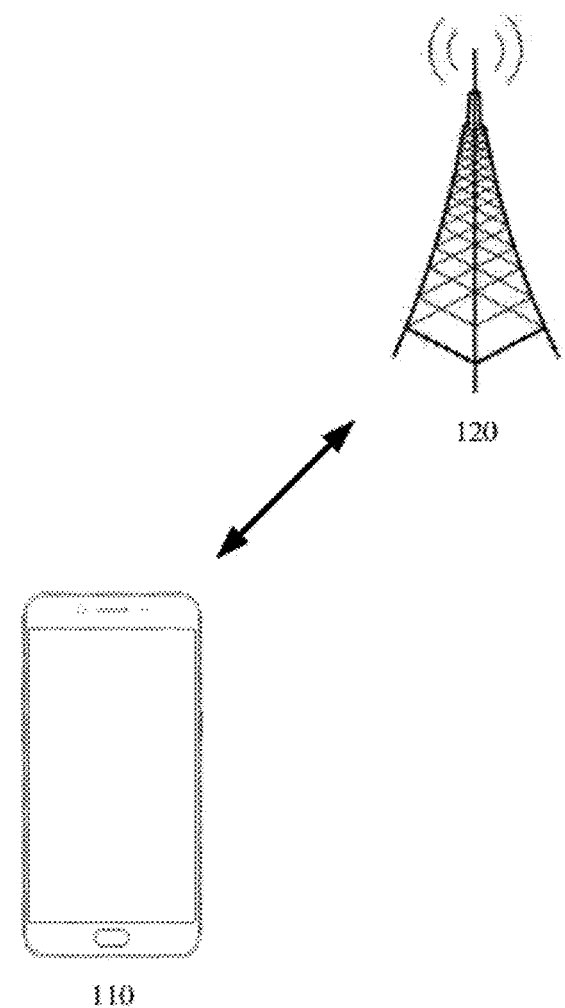
FIG. 1 is a schematic diagram of a network architecture according to an embodiment of the disclosure.

Referring to FIG. 1, FIG. 1 is a schematic diagram of a network architecture according to an embodiment of the disclosure. The network architecture shown in FIG. 1 includes UE 110 and a network device 120. At present, the network device 120 sends a message in a PDCCH, and if the message contains a P-RNTI, it is indicated that a PDSCH carries a paging message. The P-RNTI is a fixed value. Then, the network device 120 sends a paging message in the PDSCH. The paging message contains complete identification information of a UE and the identification information of the UE is used to determine whose the paging message carried in the PDSCH is. As long as the UE 110 subsequently monitors the PDCCH and finds that the P-RNTI is carried in the PDCCH, the UE 110 monitors the PDSCH regardless of whether there is a paging message for the UE 110 in the PDSCH or not. Since a beam is required to send a paging message in the NR and each paging message is required to be repeatedly sent in different beam directions, paging messages with the same size are required to be repeatedly sent for many times, which brings a relatively high signaling overhead.

For solving the problem, in the present solution, the network device 120 sends first information in an NR-PDCCH, the first information is configured for the UE to determine whether the NR-PDCCH is for the UE or not; and the network device 120 sends second information in an NR-PDSCH, the second information including a first part of identification information of a UE. The UE 110 subsequently monitors the NR-PDCCH to obtain the first information, and in the case that the NR-PDCCH is for the UE 110, the UE 110 monitors the NR-PDSCH to obtain the second information.

It can be seen that, in the solution, the network device only sends part of identification information of a UE in the NR-PDSCH. Compared with the conventional art where complete identification information of the UE is sent in the NR-PDSCH, such a solution has the advantages that the number of bits required to be carried in the NR-PDSCH may be reduced and a signaling overhead is reduced. In addition, the first information transmitted by the network device in the NR-PDCCH is configured for the UE to determine whether the NR-PDCCH is for itself or not. Compared with the conventional art where whether the PDCCH is for the UE or not is not indicated, such a solution has the advantages that the UE may exclude transmission of an NR-PDSCH that is not for itself and a performance of information transmission is further improved.

The UE is a device providing voice and/or data connectivity for a user, for example, a handheld device, vehicle-mounted device and the like with a wireless connection function. Common UE includes, for example, a mobile phone, a tablet computer, a notebook computer, a palm computer, a Mobile Internet Device (MID) and a wearable device such as a smart watch, a smart band and a pedometer.

The network device refers to a node device on a network side. For example, the network device may be a Radio Access Network (RAN) device on an access network side in a cellular network, and the RAN device refers to a device that connects UE to a wireless network, including, but not limited to, an Evolved Node B (eNB), a Radio Network Controller (RNC), a Node B (NB), a Base Station Controller (BSC), a Base Transceiver Station (BTS), a home base station (for example, a home eNB or a Home Node B (HNB)), a BaseBand Unit (BBU) and a Mobility Management Entity (MME). For another example, the network device may also be a node device in a Wireless Local Area Network (WLAN), for example, an Access Controller (AC), a gateway or a Wireless Fidelity (WiFi) Access Point (AP).

An information transmission method provided in the embodiments of the disclosure will be described below in detail in combination with the network architecture shown in FIG. 1.

Figure 2:
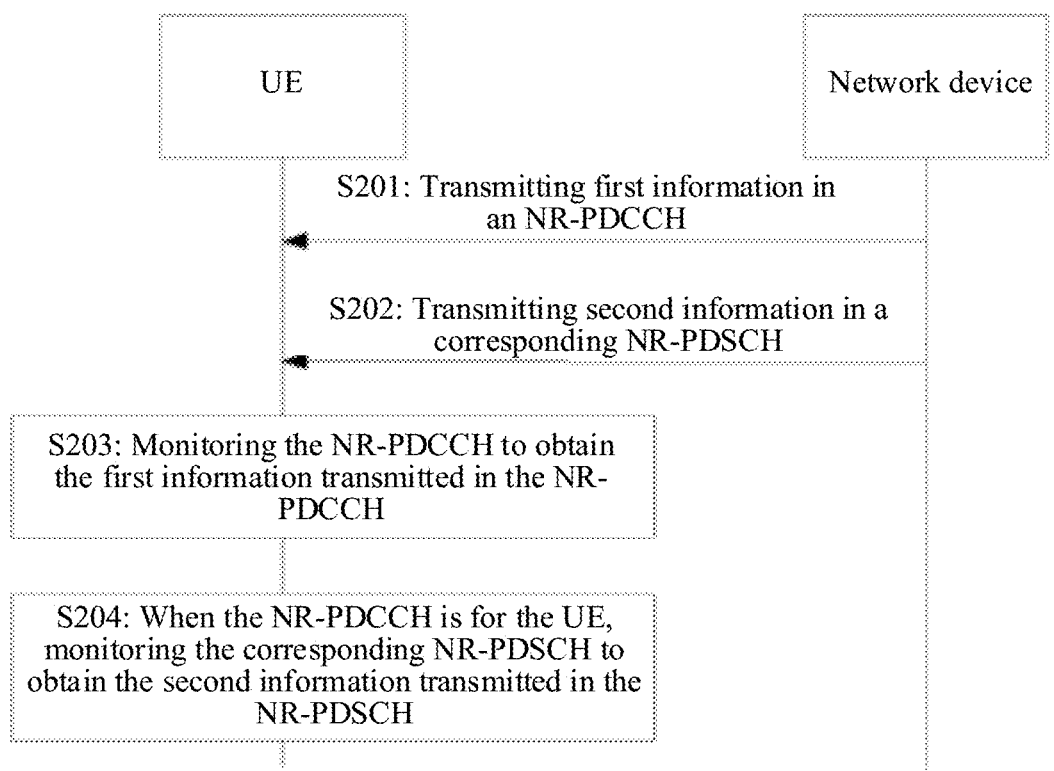
FIG. 2 is a flowchart of an information transmission method according to an embodiment of the disclosure.

Referring to FIG. 2, FIG. 2 is a flowchart of an information transmission method according to an embodiment of the disclosure. The method includes the following operations.

At S201, a network device transmits first information in an NR-PDCCH, the first information being configured for UE to determine whether the NR-PDCCH is for the UE or not.

At S202, the network device transmits second information in an NR-PDSCH, the second information including a first part of identification information of a UE.

At S203, the UE monitors the NR-PDCCH to obtain the first information transmitted in the NR-PDCCH.

At S204, when the NR-PDCCH is for the UE, the UE monitors the NR-PDSCH to obtain the second information transmitted in the NR-PDSCH.

In an example, the first information includes a second part of the identification information of the UE, the second part of the identification information of the UE in the first information being configured for the UE to determine that the NR-PDCCH is for the UE.

Specifically, the identification information of the UE includes a first part of identification information and a second part of identification information. When the second part of the identification information of the UE is matched with the second part of the identification information of the UE in the first information, the UE determines that the NR-PDCCH is for the UE. When the second part of the identification information of the UE is mismatched with the second part of the identification information of the UE in the first information, the UE determines that the NR-PDCCH is not for the UE.

It is to be noted that the first part of the identification information, transmitted in the NR-PDSCH, of the UE and the first part of the identification information of the UE have the same length and positions of the first part of the identification information, transmitted in the NR-PDSCH, of the UE and the first part of the identification information of the UE in complete identification information are the same. For example, for Serving Temporary Mobile Subscriber Identities (S-TMSIs), an S-TMSI is a binary number with a length of 40 bits. There is made such a hypothesis that the first part of the identification information, transmitted in the NR-PDSCH, of the UE is a first part of identification information of a UE 1, complete identification information of the UE 1 is S-TMSI-1 and complete identification information of the UE is S-TMSI-2. If the first part of the identification information of the UE 1 is the last 20 bits of S-TMSI-1, the first part of the identification information of the UE is the last 20 bits of S-TMSI-2. Similarly, the second part of the identification information, transmitted in the NR-PDSCH, of the UE and the second part of the identification information of the UE have the same length and positions of the second part of the identification information, transmitted in the NR-PDSCH, of the UE and the second part of the identification information of the UE in the complete identification information are the same.

For example, for S-TMSIs, there is made such a hypothesis that the complete identification information of the UE is S-TMSI-2, the first part of the identification information in S-TMSI-2 is the last 20 bits of S-TMSI-2, for example, A, and the second part of the identification information in S-TMSI-2 is the first 20 bits of S-TMSI-2, for example, B. If the second part of the identification information of the UE in the first information is the first 20 bits in complete identification information of a certain UE, for example, also B, it is indicated that the present NR-PDCCH is for the UE. If the second part of the identification information of the UE in the first information is the first 20 bits in complete identification information of a certain UE, for example, C, C being different from B, it is indicated that the present NR-PDCCH is not for the UE.

It can be seen that the network device directly sends the second part of the identification information of the UE in the PDCCH and the UE directly compares the second part of the identification information, sent in the PDCCH, of the UE with the second part of the identification information thereof, so that whether the PDCCH is for the UE or not is determined more accurately.

In an example, the identification information of the UE includes the first part of the identification information and the second part of the identification information. A second part of identification information of the UE in the first information corresponds to a P-RNTI, and the P-RNTI corresponding to the second part of identification information of the UE and the first information are used for the UE to determine whether the NR-PDCCH is for the UE or not.

Specifically, when the P-RNTI corresponding to the second part of the identification information of the UE is matched with a P-RNTI corresponding to the first information, the UE determines that the NR-PDCCH is for the UE. When the P-RNTI corresponding to the second part of the identification information of the UE is mismatched with the P-RNTI corresponding to the first information, the UE determines that the NR-PDCCH is not for the UE.

For example, for S-TMSIs, there is made such a hypothesis that the complete identification information of the UE is S-TMSI-2, a second part of identification information in S-TMSI-2 is the first 20 bits identification information of S-TMSI-2 and a P-RNTI corresponding to the first 20 bits identification information of S-TMSI-2 is P-RNTI-2. If the P-RNTI corresponding to the first information is also P-RNTI-2 (that is, the UE may decode the first information by use of P-RNTI-2), it is indicated that the present NR-PDCCH is for the UE. If the P-RNTI corresponding to the first information is P-RNTI-3 which is different from P-RNTI-2 (that is, the UE may not decode the first information by use of P-RNTI-2), it is indicated that the present NR-PDCCH is not for the UE.

It can be seen that the network device and a UE predetermine a mapping relationship between a second part of identification information of the UE and a P-RNTI, so that the network device, when sending the first information, is not required to send the second part of the identification information of the UE to the UE, the number of bits required to be carried in the PDCCH is reduced, and a signaling overhead is further reduced.

Furthermore, second parts of identification information of any two UEs correspond to different P-RNTIs. For example, a second part of identification information of a UE i corresponds to P-RNTI-1 and a second part of identification information of a UE j corresponds to P-RNTI-2, P-RNTI-1 being different from P-RNTI-2 and the UE i and the UE j being any two UEs. Alternatively, second parts of identification information of at least two UEs correspond to the same P-RNTI. For example, a second part of identification information of a UE 1 corresponds to P-RNTI-1 and a second part of identification information of a UE 2 also corresponds to P-RNTI-1.

Furthermore, P-RNTI-i corresponding to the second part of identification information of the UE i is part of the second part of the identification information of the UE i, and the UE i is any UE. For example, for S-TMSIs, if complete identification information of the UE i is S-TMSI-i and the second part of the identification information of the UE i is the first 20 bits of S-TMSI-i, P-RNTI-i corresponding to the second part of the identification information of the UE i may be the first few bits (for example, the first 6 bits) in the first 20 bits of S-TMSI-i, may also be the last few bits (for example, the last 6 bits), and may further be the middle few bits (for example, the middle 6 bits), which is not limited in the disclosure.

Furthermore, P-RNTI-i corresponding to the second part of the identification information of the UE i is part of the second part of the identification information of the UE i plus a preset value, the UE i being any UE. For example, for S-TMSIs, if complete identification information of the UE i is S-TMSI-i and the second part of identification information of the UE i is the first 20 bits of S-TMSI-i, P-RNTI-i corresponding to the second part of the identification information of the UE i may be the first few bits (for example, the first 6 bits) in the first 20 bits of S-TMSI-i plus the preset value (for example, 1), may also be the last few bits (for example, the last 6 bits) plus the preset value (for example, 1), and may further be the middle few bits (for example, the middle 6 bits) plus the preset value (for example, 1), which is not limited in the disclosure.

In an example, when the first part of the identification information of the UE in the second information and the second part of the identification information of the UE in the first information belong to the same UE, a combination of the first part of the identification information of the UE and the second part of the identification information of the UE is the complete identification information of the UE. For example, for S-TMSIs, there is made such a hypothesis that both the first part of the identification information of the UE in the second information and the second part of the identification information of the UE in the first information belong to the UE 1 and the complete identification information of the UE 1 is S-TMSI-1. If the first part of the identification information of the UE 1 is the last 20 bits of S-TMSI-1 and the second part of the identification information of the UE 1 is the first 20 bits of S-TMSI-1, it can be seen that the first part of the identification information of the UE 1 plus the second part of identification information of the UE 1 is equal to S-TMSI-1.

In an example, when the first part of the identification information of the UE in the second information and the second part of the identification information of the UE in the first information belong to the same UE, a combination of the first part of the identification information of the UE and the second part of the identification information of the UE is part of the complete identification information of the UE. For example, for S-TMSIs, there is made such a hypothesis that both the first part of the identification information of the UE in the second information and the second part of the identification information of the UE in the first information belong to the UE 1 and the complete identification information of the UE 1 is S-TMSI-1. If the first part of the identification information of the UE 1 is the last 15 bits of S-TMSI-1 and the second part of the identification information of the UE 1 is the first 20 bits of S-TMSI-1, it can be seen that the first part of the identification information of the UE 1 plus the second part of the identification information of the UE 1 is unequal to S-TMSI-1.

Furthermore, the number of bits occupied by the first part of the identification information of the UE in the second information is less than the number of bits occupied by the second part of the identification information of the UE in the first information. That is, the identification information, sent by the network device in the PDSCH, of the UE occupies fewer bits, so that the signaling overhead is further reduced.

It is to be noted that the first part of the identification information of the UE in the second information in the disclosure and the second part of the identification information of the UE in the first information in the disclosure may be identification information belonging to the same UE. For example, for S-TMSIs, the first part of the identification information of the UE in the second information in the disclosure is the last 20 bits of the S-TMSI of the UE 1 and the second part of the identification information of the UE in the first information in the disclosure is the first 20 bits of the S-TMSI of the UE 1. Moreover, the first part of the identification information of the UE in the second information in the disclosure and the second part of the identification information of the UE in the first information in the disclosure may be identification information of different UEs. For example, for S-TMSIs, the first part of the identification information of the UE in the second information in the disclosure is the last 20 bits of the S-TMSI of the UE 1 and the second part of the identification information of the UE in the first information in the disclosure is the first 20 bits of the S-TMSI of the UE 2.

In an example, the first part of the identification information of the UE in the second information is configured for the UE to determine whether the NR-PDSCH is for the UE or not.

Specifically, when the first part of the identification information of the UE is matched with the first part of the identification information of the UE in the second information, the UE determines that the NR-PDSCH is for the UE. When the first part of the identification information of the UE is mismatched with the first part of the identification information of the UE in the second information, the UE determines that the NR-PDSCH is not for the UE.

For example, for S-TMSIs, there is made such a hypothesis that the first part of the identification information, transmitted in the NR-PDSCH, of the UE is the first part of identification information of the UE 1, the complete identification information of the UE 1 is S-TMSI-1 and the complete identification information of the UE is S-TMSI-2. If the first part of the identification information of the UE 1 is the last 20 bits of S-TMSI-1, for example, A, and the first part of the identification information of the UE is the last 20 bits of S-TMSI-2, for example, also A, it is indicated that the present NR-PDSCH is for the UE. If the first part of the identification information of the UE is the last 20 bits of S-TMSI-2, for example, C, C being different from A, it is indicated that the present NR-PDSCH is not for the UE.

In an example, the second information is contained in Radio Resource Control (RRC) signaling transmitted in the NR-PDSCH.

In an example, the first information may be downlink control signaling, for example, Downlink Control Information (DCI), transmitted by the network device in the NR-PDCCH.

In addition, the first information further includes instruction information, and the instruction information includes a parameter of the NR-PDSCH. When the NR-PDCCH is for the UE, the instruction information is configured to instruct the UE to receive the second information transmitted in the NR-PDSCH according to the parameter of the NR-PDSCH.

The second information may be a paging message, or, the second information includes a paging message.

It can be seen that, in the solution, the network device only sends part of the identification information of the UE in the NR-PDSCH, and compared with the conventional art where complete identification information of the UE is sent in the NR-PDSCH, such a solution has the advantages that the number of bits required to be carried in the NR-PDSCH may be reduced and a signaling overhead is reduced. In addition, the first information transmitted by the network device in the NR-PDCCH is used for the UE to determine whether the NR-PDCCH is for itself or not, and compared with the conventional art where whether the NR-PDCCH is for the UE or not is not indicated, such a solution has the advantages that the UE may exclude transmission of an NR-PDSCH that is not for itself and a performance of information transmission is further improved.

Figure 3:
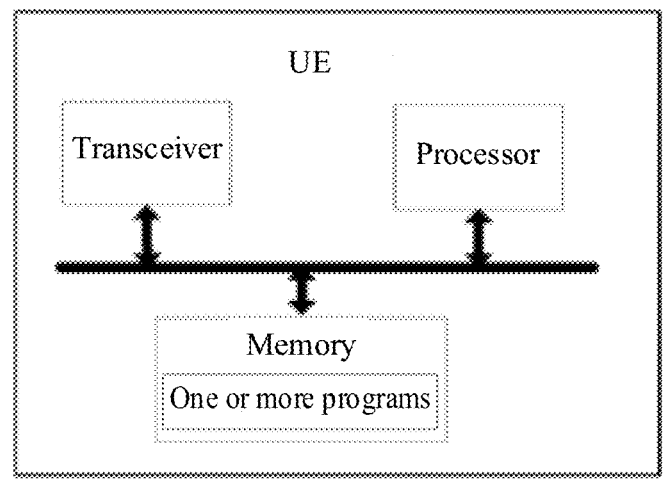
FIG. 3 is a structure diagram of UE according to an embodiment of the disclosure.

Referring to FIG. 3, FIG. 3 illustrates UE 300 according to an embodiment of the disclosure. The UE includes one or more processors, one or more memories, one or more transceivers and one or more programs.

The one or more programs are stored in the memories and configured to be executed by the one or more processors.

The programs include instructions being configured to execute the following operations.

An NR-PDCCH is monitored to obtain first information transmitted in the NR-PDCCH, the first information being configured for the UE to determine whether the NR-PDCCH is for the UE or not.

When the NR-PDCCH is for the UE, an NR-PDSCH is monitored to obtain second information transmitted in the NR-PDSCH, the second information including a first part of identification information of a UE.

In an example, the first information includes a second part of the identification information of the UE, the second part of the identification information of the UE in the first information being configured for the UE to determine that the NR-PDCCH is for the UE.

In an example, identification information of the UE includes a first part of identification information and a second part of identification information, a second part of identification information of the UE in the first information corresponds to a P-RNTI, and a P-RNTI corresponding to the second part of the identification information of the UE and the first information are configured for the UE to determine that the NR-PDCCH is for the UE.

In an example, when the first part of the identification information of the UE in the second information and the second part of the identification information of the UE in the first information belong to the same UE, a combination of the first part of the identification information of the UE in the second information and the second part of the identification information of the UE in the first information is complete identification information of the UE, or the combination of the first part of the identification information of the UE in the second information and the second part of the identification information of the UE in the first information is part of the complete identification information of the UE.

In an example, a number of bits occupied by the first part of the identification information of the UE in the second information is less than a number of bits occupied by the second part of the identification information of the UE in the first information.

In an example, the first part of the identification information of the UE in the second information is configured for the UE to determine whether the NR-PDSCH is for the UE or not.

In an example, the second information is contained in RRC signaling transmitted in the NR-PDSCH.

It can be seen that, in the solution, a network device only sends part of identification information of the UE in the NR-PDSCH, and compared with the conventional art where the complete identification information of the UE is sent in the NR-PDSCH, such a solution has the advantages that the number of bits required to be carried in the NR-PDSCH may be reduced and a signaling overhead is reduced. In addition, the first information transmitted by the network device in the NR-PDCCH is used for the UE to determine whether the NR-PDCCH is for itself or not, and compared with the conventional art where whether the NR-PDCCH is for the UE or not is not indicated, such a solution has the advantages that the UE may exclude transmission of an NR-PDSCH that is not for itself and performance of information transmission is further improved.

Figure 4:
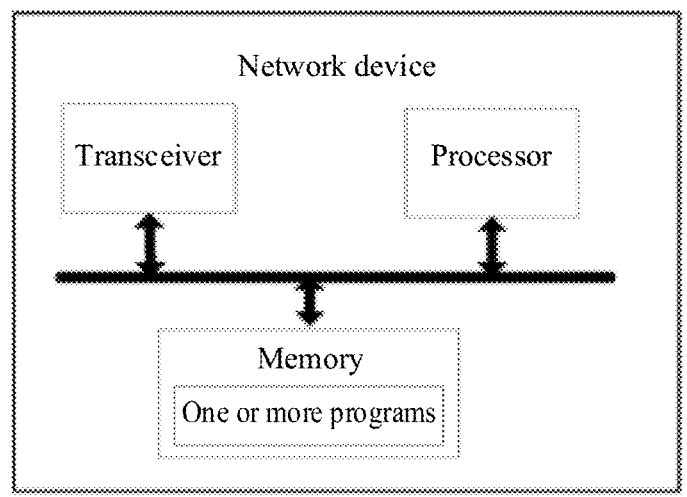
FIG. 4 is a structure diagram of a network device according to an embodiment of the disclosure.

Referring to FIG. 4, FIG. 4 illustrates a network device 400 according to an embodiment of the disclosure. The network device includes one or more processors, one or more memories, one or more transceivers and one or more programs.

The one or more programs are stored in the memories and configured to be executed by the one or more processors.

The programs include instructions being configured to execute the following operations.

First information is transmitted in an NR-PDCCH, the first information being configured for UE to determine whether the NR-PDCCH is for the UE or not.

Second information is transmitted in an NR-PDSCH, the second information including a first part of identification information of a UE.

In an example, the first information includes a second part of identification information of the UE, the second part of the identification information of the UE in the first information being configured for the UE to determine that the NR-PDCCH is for the UE.

In an example, identification information of the UE includes a first part of identification information and a second part of identification information, a second part of identification information of the UE in the first information corresponds to a P-RNTI, and a P-RNTI corresponding to the second part of the identification information of the UE and the first information are configured for the UE to determine that the NR-PDCCH is for the UE.

In an example, when the first part of the identification information of the UE in the second information and the second part of the identification information of the UE in the first information belong to the same UE, a combination of the first part of the identification information of the UE in the second information and the second part of the identification information of the UE in the first information is complete identification information of the UE, or the combination of the first part of the identification information of the UE in the second information and the second part of the identification information of the UE in the first information is part of the complete identification information of the UE.

In an example, a number of bits occupied by the first part of the identification information of the UE in the second information is less than a number of bits occupied by the second part of the identification information of the UE in the first information.

In an example, the first part of the identification information of the UE in the second information is configured for the UE to determine whether the NR-PDSCH is for the UE or not.

In an example, the second information is contained in RRC signaling transmitted in the NR-PDSCH.

It can be seen that, in the solution, the network device directly or indirectly sends part of identification information of the UE in the PDCCH and then only sends part of identification information of the UE in the PDSCH, and compared with a conventional art where complete identification information of the UE is sent in the PDSCH, such a solution has the advantages that the number of bits required to be carried in the NR-PDSCH may be reduced and a signaling overhead is reduced.

Figure 5:
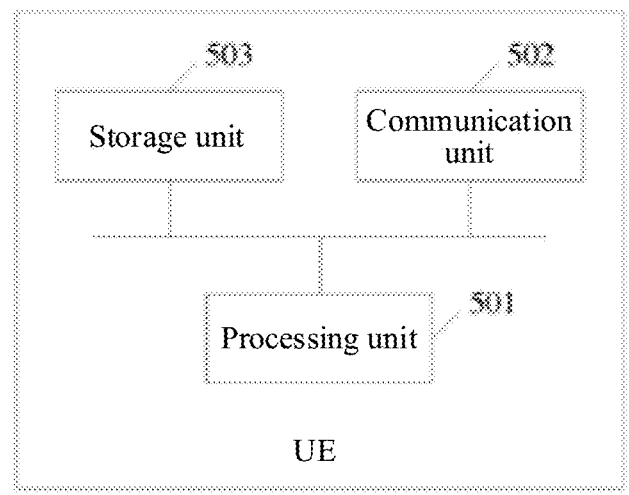
FIG. 5 is a structure diagram of UE according to another embodiment of the disclosure.

Referring to FIG. 5, FIG. 5 is a structure diagram of UE 500 according to an embodiment of the disclosure. The UE 500 includes a processing unit 501, a communication unit 502 and a storage unit 503.

The processing unit 501 is configured to monitor, through the communication unit 502, an NR-PDCCH to obtain first information transmitted in the NR-PDCCH, the first information being configured for the UE to determine whether the NR-PDCCH is for the UE or not.

The processing unit 501 is further configured to, when the NR-PDCCH is for the UE, monitor, through the communication unit 502, an NR-PDSCH to obtain second information transmitted in the NR-PDSCH, the second information including a first part of identification information of a UE.

The processing unit 501 may be a processor or a controller (which may be, for example, a Central Processing Unit (CPU), a universal processor, a Digital Signal Processor (DSP), an Application-Specific Integrated Circuit (ASIC), a Field Programmable Gate Array (FPGA) or another programmable logical device, transistor logical device, hardware component or any combination thereof, which may implement or execute various exemplary logical blocks, modules and circuits described in combination with the contents disclosed in the disclosure. The processor may also be a combination for realizing a calculation function (for example, including a combination of one or more microprocessors or a combination of a DSP and a microprocessor). The communication unit 502 may be a transceiver, a transceiver circuit, a radio frequency chip, a communication interface and the like. The storage unit 503 may be a memory.

When the processing unit 501 is a processor, the communication unit 502 is a communication interface and the storage unit 503 is a memory, the UE involved in the embodiment of the disclosure may be the UE shown in FIG. 3.

Figure 6:
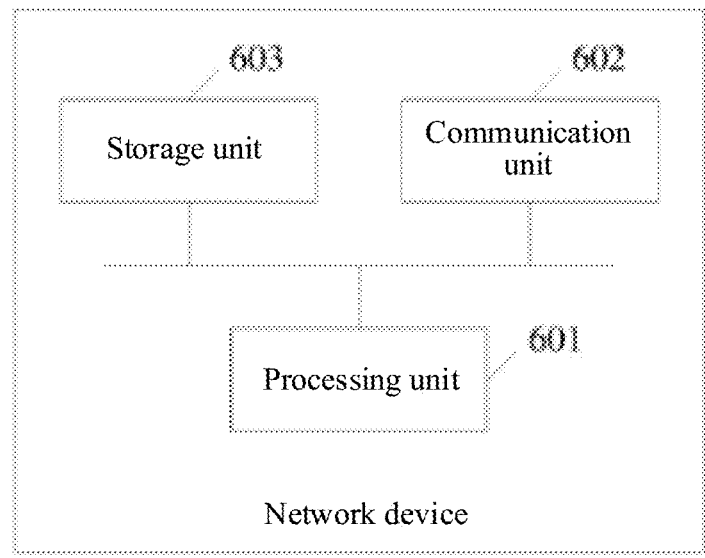
FIG. 6 is a structure diagram of a network device according to another embodiment of the disclosure.

Referring to FIG. 6, FIG. 6 is a structure diagram of a network device 600 according to an embodiment of the disclosure. The network device 600 includes a processing unit 601, a communication unit 602 and a storage unit 603.

The processing unit 601 is configured to transmit, through the communication unit 602, first information in an NR-PDCCH, the first information being configured for UE to determine whether the NR-PDCCH is for the UE or not.

The processing unit 601 is further configured to transmit, through the communication unit 602, second information in an NR-PDSCH, the second information including a first part of identification information of a UE.

The processing unit 601 may be a processor or a controller (which may be, for example, a CPU), a universal processor, a DSP, an ASIC, an FPGA or another programmable logical device, transistor logical device, hardware component or any combination thereof, which may implement or execute various exemplary logical blocks, modules and circuits described in combination with the contents disclosed in the disclosure. The processor may also be a combination for realizing a calculation function (for example, including a combination of one or more microprocessors or a combination of a DSP and a microprocessor). The communication unit 602 may be a transceiver, a transceiver circuit, a radio frequency chip, a communication interface and the like. The storage unit 603 may be a memory.

When the processing unit 601 is a processor, the communication unit 602 is a communication interface and the storage unit 603 is a memory, the network device involved in the embodiment of the disclosure may be the network device shown in FIG. 4.

Figure 7:
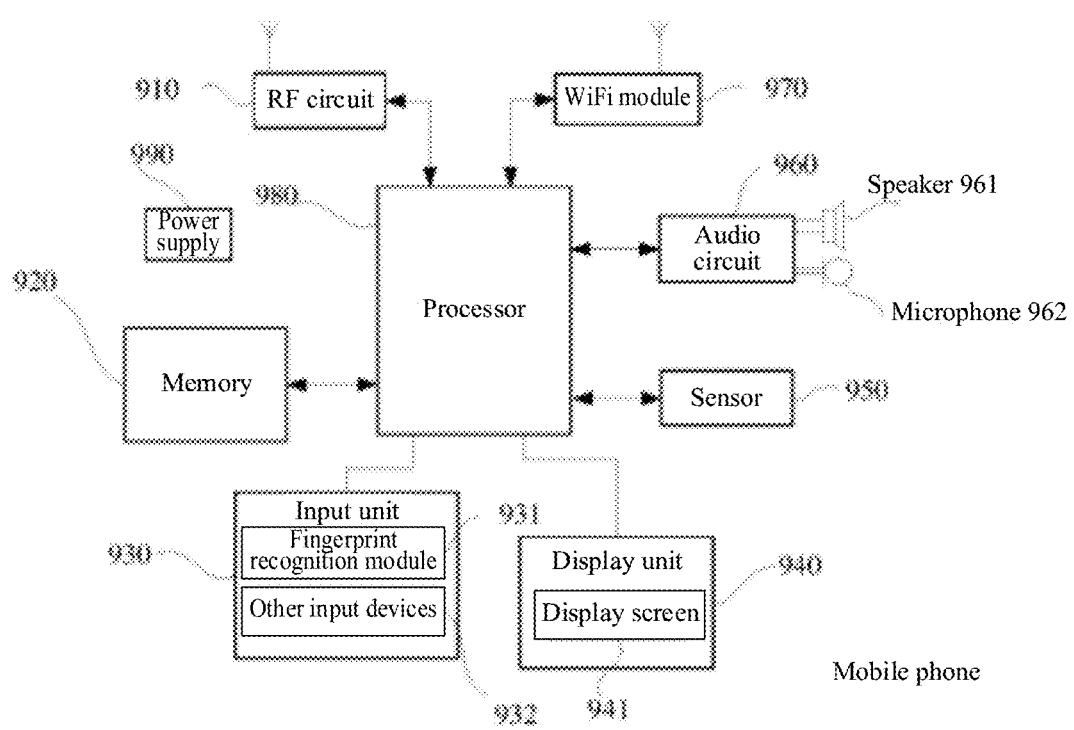
FIG. 7 is a structure diagram of UE according to another embodiment of the disclosure.

An embodiment of the disclosure further provides another piece of UE. As shown in FIG. 7, for convenience of explanation, only parts related to the embodiment of the disclosure are shown, and specific technical details which are undisclosed may refer to the method section of the embodiments of the disclosure. The UE may be any UE including a mobile phone, a tablet computer, a Personal Digital Assistant (PDA), a Point of Sales (POS), a vehicle-mounted computer and the like. For example, the UE is a mobile phone.

FIG. 7 is a block diagram showing a partial structure of a mobile phone related to the UE according to an embodiment of the disclosure. Referring to FIG. 7, the mobile phone includes components such as a Radio Frequency (RF) circuit 910, a memory 920, an input unit 930, a display unit 940, a sensor 950, an audio circuit 960, a WiFi module 970, a processor 980 and a power supply 990. Those skilled in the art will appreciate that the structure of the mobile phone shown in FIG. 7 is not intended to limit the mobile phone and may include components more or fewer than those shown in the figure or a combination of some components or different component arrangements.

Each component of the mobile phone will be specifically introduced below in combination with FIG. 7.

The RF circuit 910 may be configured to receive and send information. The RF circuit 910 usually includes, but not limited to, an antenna, at least one amplifier, a transceiver, a coupler, a Low Noise Amplifier (LNA), a duplexer and the like. In addition, the RF circuit 910 may also communicate with a network and another device through a wireless communication. Any communication standard or protocol may be adopted for the wireless communication, including, but not limited to, a Global System of Mobile communication (GSM), a General Packet Radio Service (GPRS), a Code Division Multiple Access (CDMA), a Wideband Code Division Multiple Access (WCDMA), a Long Term Evolution (LTE), an electronic mail, a Short Messaging Service (SMS) and the like.

The memory 920 may be configured to store a software program and a module. The processor 980 operates the software program and module stored in the memory 920, thereby executing various function applications and data processing in the mobile phone. The memory 920 may mainly include a program storage region and a data storage region. The program storage region may store an operating system, an application program required by at least one function and the like. The data storage region may store data created according to use of the mobile phone and the like. In addition, the memory 920 may include a high-speed Random Access Memory (RAM), and may include a nonvolatile memory, for example, at least one disk storage device, flash memory device or other volatile solid-state storage device.

The input unit 930 may be configured to receive input digital or character information and generate key signal input related to user setting and function control of the mobile phone. Specifically, the input unit 930 may include a fingerprint recognition module 931 and another input device 932. The fingerprint recognition module 931 may acquire fingerprint data of a user thereon. Besides the fingerprint recognition module 931, the input unit 930 may further include the other input device 932. Specifically, the other input device 932 may include, but not limited to, one or more of a touch screen, a physical keyboard, a function key (for example, a volume control button and a switch button), a trackball, a mouse, a stick and the like.

The display unit 940 may be configured to display information input by the user or information provided for the user as well as various menus of the mobile phone. The display unit 940 may include a display screen 941. Optionally, the display screen 941 may be configured in form of a Liquid Crystal Display (LCD) or an Organic Light-Emitting Diode (OLED). In FIG. 7, the fingerprint recognition module 931 and the display screen 941 are two independent components to realize input and output functions of the mobile phone. However, in some embodiments, the fingerprint recognition module 931 and the display screen 941 may be integrated to realize the input and play functions of the mobile phone.

The mobile phone may further include at least one sensor 950, for example, a light sensor, a motion sensor and other sensors. Specifically, the light sensor may include an ambient light sensor and a proximity sensor. The ambient light sensor may adjust brightness of the display screen 941 according to brightness of the ambient light, and the proximity sensor may turn off the display screen 941 and/or backlight when the mobile phone is moved to the ear. As a motion sensor, an accelerometer sensor may detect a magnitude of an acceleration in each direction (usually three axes), may detect a magnitude and direction of the gravity under a motionless condition, and may be configured for an application recognizing a posture of the mobile phone (for example, landscape and portrait switching, a related game and magnetometer posture calibration), a vibration recognition related function (for example, a pedometer, a knocking) and the like. Other sensors, for example, a gyroscope, a barometer, a hygrometer, a thermometer and an infrared sensor, which may be configured in the mobile phone, will not be elaborated herein.

The audio circuit 960, a speaker 961 and a microphone 962 may provide an audio interface between the user and the mobile phone. The audio circuit 960 may transmit an electric signal obtained by converting received audio data to the speaker 961, and the speaker 961 converts it into a sound signal for playing. On the other hand, the microphone 962 converts a collected sound signal into an electric signal. The audio circuit 960 receives and converts the electric signal into audio data. The audio data is processed by the processor 980 and sent to, for example, another mobile phone through the RF circuit 910, or the audio data is stored to the memory 920 for further processing.

WiFi is a short-distance wireless transmission technology. With the WiFi module 970, the mobile phone may allow the user to receive and send an electronic mail, browse a webpage, access a streaming media and the like, and wireless wideband Internet access is provided for the user. Although the WiFi module 970 is shown in FIG. 7, it can be understood that it is not a necessary composition of the mobile phone and may completely be omitted according to a requirement without changing the scope of the essence of the disclosure.

The processor 980 is a control center of the mobile phone, connects each part of the whole mobile phone by use of various interfaces and lines and executes various functions and data processing in the mobile phone by running or executing the software program and/or module stored in the memory 920 and calling the data stored in the memory 920, thereby monitoring the whole mobile phone. Optionally, the processor 980 may include one or more processing units. Preferably, the processor 980 may integrate an application processor and a modem processor. The application processor is mainly configured to process the operating system, a user interface, an application program and the like. The modem processor is mainly configured to process wireless communication. It will be appreciated that the modem processor may also not be integrated into the processor 980.

The mobile phone further includes the power supply 990 that supplies power to the various components. Preferably, the power supply may be logically connected with the processor 980 through a power management system, thereby realizing functions such as charging and discharging management, power consumption management and the like through the power management system.

Although not shown in the figure, the mobile phone may further include a camera, a Bluetooth module and the like, which will not be elaborated herein.

In the embodiment shown in FIG. 2, the flow on a UE side in each step of the method may be implemented on the basis of the structure of the mobile phone.

In the embodiment shown in FIG. 5, each functional unit may be implemented based on the structure of the mobile phone.

An embodiment of the disclosure further provides a computer-readable storage medium having stored therein a computer program for electronic data exchange, the computer program enabling a computer to execute part or all of the steps executed by the UE in the abovementioned method embodiments.

An embodiment of the disclosure further provides a computer-readable storage medium having stored therein a computer program for electronic data exchange, the computer program enabling a computer to execute part or all of the steps executed by the network device in the abovementioned method embodiments.

An embodiment of the disclosure further provides a computer program product. The computer program product includes a non-transitory computer-readable storage medium storing a computer program. The computer program may be operated to enable a computer to execute part or all of the steps executed by the UE in the abovementioned methods. The computer program product may be a software installation package.

An embodiment of the disclosure further provides a computer program product. The computer program product includes a non-transitory computer-readable storage medium storing a computer program. The computer program may be operated to enable a computer to execute part or all of the steps executed by the network device in the abovementioned method embodiments. The computer program product may be a software installation package.

The steps of the method or algorithm described in the embodiments of the disclosure may be implemented in the form of hardware, and may also be implemented in the form of software executed by a processor. Software instructions may consist of corresponding software modules, and the software module may be stored in a RAM, a flash memory, a Read Only Memory (ROM), an Erasable Programmable ROM (EPROM), an Electrically EPROM (EEPROM), a register, a hard disk, a mobile hard disk, a Compact Disc-ROM (CD-ROM) or a storage medium in any other form well known in the field. An exemplary storage medium is coupled to the processor, thereby enabling the processor to read information from the storage medium and write information into the storage medium. Of course, the storage medium may also be a component of the processor. The processor and the storage medium may be located in an ASIC. In addition, the ASIC may be located in an access network device, a target network device or a core network device. Of course, the processor and the storage medium may also exist in the access network device, the target network device or the core network device as discrete components.

Those skilled in the art will appreciate that, in one or more abovementioned examples, all or part of the functions described in the embodiments of the disclosure may be implemented through software, hardware, firmware or any combination thereof. During implementation with the software, all or part of the functions described in the embodiments of the disclosure may be implemented in form of computer program product. The computer program product includes one or more computer instructions. When the computer program instructions are loaded and executed on a computer, the flows or functions according to the embodiments of the disclosure are completely or partially generated. The computer may be a universal computer, a dedicated computer, a computer network or another programmable device. The computer instruction may be stored in a computer-readable storage medium or may be transmitted from one computer-readable storage medium to another computer-readable storage medium. For example, the computer instruction may be transmitted from a website, computer, server or data center to another website, computer, server or data center in a wired (for example, coaxial cable, optical fiber or Digital Subscriber Line (DSL)) or wireless (for example, infrared, wireless or microwave) manner. The computer-readable storage medium may be any available medium accessible for the computer or a data storage device, such as a server and a data center, including one or more integrated available medium. The available medium may be a magnetic medium (for example, a floppy disk, a hard disk and a magnetic tape), an optical medium (for example, a Digital Video Disc (DVD)), a semiconductor medium (for example, a Solid State Disk (SSD)) or the like.

The purposes, technical solutions and beneficial effects of the embodiments of the disclosure are further described in detail in the abovementioned specific implementations. It is to be understood that the above description is only the specific implementations of the embodiments of the disclosure and not intended to limit the scope of protection of the embodiments of the disclosure. Any modifications, equivalent replacements, improvements and the like which are made on the basis of the technical solutions in the embodiments of the disclosure shall fall within the scope of protection of the embodiments of the disclosure.

What is claimed is:

1. An information transmission method, comprising:
   monitoring, by User Equipment (UE), a New Radio Physical Downlink Control Channel (NR-PDCCH) to obtain first information transmitted in the NR-PDCCH, the first information being configured for the UE to determine whether the NR-PDCCH is for the UE or not; and
   when the NR-PDCCH is for the UE, monitoring, by the UE, a New Radio Physical Downlink Shared Channel (NR-PDSCH) to obtain second information transmitted in the NR-PDSCH, the second information comprising a first part of UE identification information, wherein
   the first information comprises a second part of the UE identification information, the second part of the UE identification information in the first information being configured for the UE to determine that the NR-PDCCH is for the UE.

2. The method of claim 1, wherein identification information of the UE comprises a first part of identification information and a second part of identification information, the second part of the UE identification information in the first information corresponds to a Paging Radio Network Temporary Identity (P-RNTI), and the P-RNTI corresponding to the second part of the identification information of the UE and the first information are configured for the UE to determine that the NR-PDCCH is for the UE.

3. The method of claim 1, wherein when the first part of the UE identification information in the second information and the second part of the UE identification information in the first information belong to a same UE, a combination of the first part of the UE identification information in the second information and the second part of the UE identification information in the first information is complete UE identification information, or the combination of the first part of the UE identification information in the second information and the second part of the UE identification information in the first information is part of the complete UE identification information.

4. The method of claim 3, wherein a number of bits occupied by the first part of the UE identification information in the second information is less than a number of bits occupied by the second part of the UE identification information in the first information.

5. The method of claim 1, wherein the first part of the UE identification information in the second information is configured for the UE to determine whether the NR-PDSCH is for the UE or not.

6. The method of claim 1, wherein the second information is contained in Radio Resource Control (RRC) signaling transmitted in the NR-PDSCH.

7. An information transmission method, comprising:
   transmitting, by a network device, first information in a New Radio Physical Downlink Control Channel (NR-PDCCH), the first information being configured for User Equipment (UE) to determine whether the NR-PDCCH is for the UE or not; and
   transmitting, by the network device, second information in a New Radio Physical Downlink Shared Channel (NR-PDSCH), the second information comprising a first part of UE identification information, wherein
   the first information comprises a second part of the UE identification information, the second part of the UE identification information in the first information being configured for the UE to determine that the NR-PDCCH is for the UE.

8. The method of claim 7, wherein identification information of the UE comprises a first part of identification information and a second part of identification information, the second part of the UE identification information in the first information corresponds to a Paging Radio Network Temporary Identity (P-RNTI), and the P-RNTI corresponding to the second part of the identification information of the UE and the first information are configured for the UE to determine that the NR-PDCCH is for the UE.

9. The method of claim 7, wherein, when the first part of the UE identification information in the second information and the second part of the UE identification information in the first information belong to a same UE, a combination of the first part of the UE identification information in the second information and the second part of the UE identification information in the first information is complete UE identification information, or the combination of the first part of the UE identification information in the second information and the second part of the UE identification information in the first information is part of the complete UE identification information.

10. The method of claim 9, wherein a number of bits occupied by the first part of the UE identification information in the second information is less than a number of bits occupied by the second part of the UE identification information in the first information.

11. The method of claim 7, wherein the first part of the UE identification information in the second information is configured for the UE to determine whether the NR-PDSCH is for the UE or not.

12. User Equipment (UE), comprising:
a processor;
a communication interface; and
a memory for storing instructions executable by the processor,
wherein the processor is configured to execute the instructions to:
monitor, through the communication interface, a New Radio Physical Downlink Control Channel (NR-PDCCH) to obtain first information transmitted in the NR-PDCCH, the first information being configured for the UE to determine whether the NR-PDCCH is for the UE or not; and
when the NR-PDCCH is for the UE, monitor, through the communication interface, a New Radio Physical Downlink Shared Channel (NR-PDSCH) to obtain second information transmitted in the NR-PDSCH, the second information comprising a first part of UE identification information, wherein
the first information comprises a second part of the UE identification information, the second part of the UE identification information in the first information being configured for the UE to determine that the NR-PDCCH is for the UE.

13. The UE of claim 12, wherein identification information of the UE comprises a first part of identification information and a second part of identification information, the second part of the UE identification information in the first information corresponds to a Paging Radio Network Temporary Identity (P-RNTI), and the P-RNTI corresponding to the second part of the identification information of the UE and the first information are configured for the UE to determine that the NR-PDCCH is for the UE.

14. The UE of claim 12, wherein when the first part of the UE identification information in the second information and the second part of the UE identification information in the first information belong to a same UE, a combination of the first part of the UE identification information in the second information and the second part of the UE identification information in the first information is complete UE identification information, or the combination of the first part of the UE identification information in the second information and the second part of the UE identification information in the first information is part of the complete UE identification information.

15. The UE of claim 14, wherein a number of bits occupied by the first part of the UE identification information in the second information is less than a number of bits occupied by the second part of the UE identification information in the first information.

16. The UE of claim 12, wherein the first part of the UE identification information in the second information is configured for the UE to determine whether the NR-PDSCH is for the UE or not.

17. The UE of claim 12, wherein the second information is contained in Radio Resource Control (RRC) signaling transmitted in the NR-PDSCH.

* * * * *